United States Patent
Lyu

(10) Patent No.: US 11,637,968 B2
(45) Date of Patent: Apr. 25, 2023

(54) IMAGE PHOTOGRAPHING METHOD OF ELECTRONIC DEVICE AND ELECTRONIC DEVICE

(71) Applicant: SAMSUNG ELECTRONICS CO., LTD., Suwon-si (KR)

(72) Inventor: Dug In Lyu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 254 days.

(21) Appl. No.: 16/764,210

(22) PCT Filed: Oct. 29, 2018

(86) PCT No.: PCT/KR2018/012922
§ 371 (c)(1),
(2) Date: May 14, 2020

(87) PCT Pub. No.: WO2019/098567
PCT Pub. Date: May 23, 2019

(65) Prior Publication Data
US 2020/0374470 A1    Nov. 26, 2020

(30) Foreign Application Priority Data
Nov. 15, 2017    (KR) .................... 10-2017-0152448

(51) Int. Cl.
*H04N 5/247* (2006.01)
*G06T 7/246* (2017.01)
(Continued)

(52) U.S. Cl.
CPC ............ *H04N 5/247* (2013.01); *B25J 9/0003* (2013.01); *B25J 9/12* (2013.01); *B25J 9/1697* (2013.01);
(Continued)

(58) Field of Classification Search
CPC ............ H04N 5/23299; H04N 5/23238; B25J 9/0003; B25J 9/1697; B25J 19/023;
(Continued)

(56) References Cited

U.S. PATENT DOCUMENTS 8,405,732 B2 *    3/2013  Ahiska ............. G08B 13/19608
                                                    348/211.3
8,786,672 B2 *    7/2014  Olavi ............... G08B 13/19689
                                                    348/36
(Continued)

FOREIGN PATENT DOCUMENTS

CN    106161937 A    * 11/2016
JP    2004-289778        10/2004
(Continued)

OTHER PUBLICATIONS

M. Doi, M. Nakakita, Y. Aoki and S. Hashimoto, "Real-time vision system for autonomous mobile robot," Proceedings 10th IEEE International Workshop on Robot and Human Interactive Communication. Roman 2001 (Cat. No. 01TH8591), 2001, pp. 442-449, doi: 10.1109/ROMAN.2001.981944. (Year: 2002).*

(Continued)

*Primary Examiner* — John Villecco
(74) *Attorney, Agent, or Firm* — Nixon & Vanderhye, P.C.

(57) ABSTRACT

An electronic device, according to various embodiments, may comprise: a first camera having a first viewing angle; a second camera having a second viewing angle; and a processor for causing the first camera to monitor each of one or more subjects, and causing the second camera to photograph a subject that has moved from among the one or more subjects. Other embodiments are possible.

13 Claims, 10 Drawing Sheets

(51) Int. Cl.
*G06T 7/70* (2017.01)
*H04N 5/232* (2006.01)
*B25J 9/00* (2006.01)
*B25J 9/12* (2006.01)
*B25J 9/16* (2006.01)
*G06T 7/00* (2017.01)

(52) U.S. Cl.
CPC ............ *G06T 7/0002* (2013.01); *G06T 7/248* (2017.01); *G06T 7/70* (2017.01); *H04N 5/23299* (2018.08)

(58) Field of Classification Search
CPC ........ G08B 13/19623; G08B 13/19643; G08B 13/19641
See application file for complete search history.

(56) References Cited

U.S. PATENT DOCUMENTS

| | | | | |
|---|---|---|---|---|
| 10,510,155 | B1* | 12/2019 | Islam | H04N 13/122 |
| 10,908,615 | B2* | 2/2021 | Nishimura | G06T 7/20 |
| 10,917,560 | B2* | 2/2021 | Itoh | B25J 9/1697 |
| 2003/0071891 | A1* | 4/2003 | Geng | H04N 5/23293 348/E5.042 |
| 2010/0002071 | A1* | 1/2010 | Ahiska | H04N 5/3572 348/240.99 |
| 2013/0293684 | A1* | 11/2013 | Becker | G01S 7/491 348/47 |
| 2014/0135990 | A1* | 5/2014 | Stuart | H04N 5/232933 700/259 |
| 2015/0312445 | A1 | 10/2015 | Cha et al. | |
| 2017/0153646 | A1 | 6/2017 | Shin et al. | |
| 2017/0286901 | A1* | 10/2017 | Skaff | G06V 10/245 |
| 2018/0020145 | A1* | 1/2018 | Kotfis | G06Q 10/087 |
| 2018/0143640 | A1 | 5/2018 | Chae et al. | |
| 2018/0259971 | A1* | 9/2018 | Nishimura | B25J 9/1697 |
| 2019/0368865 | A1* | 12/2019 | Corkum | G06T 7/521 |
| 2020/0084432 | A1* | 3/2020 | Ravirala | H04N 13/271 |
| 2021/0037214 | A1* | 2/2021 | Itoh | H04N 7/181 |
| 2022/0060637 | A1* | 2/2022 | Prangenberg | H04N 5/23296 |

FOREIGN PATENT DOCUMENTS

| | | | |
|---|---|---|---|
| JP | 2004289778 A | * | 10/2004 |
| JP | 2008-311886 | | 12/2008 |
| JP | 2012030320 A | * | 2/2012 |
| JP | 2015-058488 | | 3/2015 |
| KR | 10-2010-0135103 | | 12/2010 |
| KR | 10-2011-0015731 | | 2/2011 |
| KR | 10-1096157 | | 12/2011 |
| KR | 101096157 B1 | * | 12/2011 |
| KR | 10-2014-0067448 | | 6/2014 |
| KR | 10-1480626 | | 1/2015 |
| KR | 10-1726696 | | 4/2017 |

OTHER PUBLICATIONS

T. Mizumoto and S. Akamatsu, "Integrated visual human tracking system composed of omni-directional and PTZ cameras," 2011 IEEE International Conference on Signal Processing, Communications and Computing (ICSPCC), 2011, pp. 1-4, doi: 10.1109/ICSPCC.2011.6061658. (Year: 2011).*

M. Yu, H. Wu and H. Lin, "A visual surveillance system for mobile robot using omnidirectional and PTZ cameras," Proceedings of SICE Annual Conference 2010, 2010, pp. 37-42. (Year: 2010).*

C. Fahn and C. Lo, "A high-definition human face tracking system using the fusion of omni-directional and PTZ cameras mounted on a mobile robot," 2010 5th IEEE Conference on Industrial Electronics and Applications, 2010, pp. 6-11, doi: 10.1109/ICIEA.2010.5514985. (Year: 2010).*

International Search Report for PCT/KR2018/012922 dated Mar. 4, 2019, 5 pages.

Written Opinion of the ISA for PCT/KR2018/012922 dated Mar. 4, 2019, 6 pages.

Notification of Reasons for Rejection dated Feb. 16, 2022 in Korean Patent Application No. 10-2017-0152448 and English-language translation.

Office Action dated Oct. 12, 2022 in KR Application No. 10-2017-0152448 and English-language machine translation.

* cited by examiner

IMAGE PHOTOGRAPHING METHOD OF ELECTRONIC DEVICE AND ELECTRONIC DEVICE

CROSS-REFERENCE TO RELATED APPLICATIONS

This application is a U.S. National Stage application under 35 U.S.C. § 371 of an International application filed on Oct. 29, 2018 and assigned application number PCT/KR2018/012922, which claimed the priority of a Korean patent application filed on Nov. 15, 2017 in the Korean Intellectual Property Office and assigned Serial number 10-2017-0152448, the entire disclosure of which is hereby incorporated by reference.

FIELD

Various embodiments relate to a method for capturing an image on an electronic device and the electronic device.

DESCRIPTION OF RELATED ART

The recent growth of sensor and artificial intelligence technology has led to wide use of personal service robots.

For example, movable personal service robots pack sensors and cameras and provide various functions, such as vacuuming or carrying home items. For example, a personal service robot may take images via one or more cameras and identify things and/or people.

An electronic device may include one or more cameras and use the cameras for various purposes.

For example, the electronic device may generate three-dimensional data using the phase differences between images obtained at different angles via two cameras attached to the back of the electronic device.

As another example, if cameras in an electronic device have different capturing angles, the electronic device may capture a wider area via a wide-angle camera and a specific object in a larger size via a camera with a normal angle, in the same position.

As yet another example, if an electronic device has a dual camera, the electronic device may measure the depth of field of an object using the dual-camera unit. For example, the dual camera may capture using one lens with a short focal length and the other with a long focal length. For example, the dual camera eliminates the need for a focusing motor. Thus, a slim camera module may be equipped in the electronic device. Further, the dual camera may reduce focusing time and enable out-focus shooting of portraits or sharp and clear capturing of both the figure and background.

SUMMARY

According to various embodiments, a robot may be used to automatically capture images without the user's manipulation.

According to various embodiments, there may be provided a method of capturing images by an electronic device, in which the electronic device is implemented as a robot playing a role as a human photographer, and the electronic device. For example, an electronic device may automatically discover an object, set a capturing composition, and take an image of the object as if a person does so on an electronic device (e.g., a camera device) to take a photo.

According to various embodiments, an electronic device may comprise a first camera with a first viewing angle, a second camera with a second viewing angle and a processor configured to monitor each of one or more objects using the first camera and capture a moved object among the one or more objects using the second camera.

According to various embodiments, a method of capturing an image by an electronic device may comprise monitoring each of one or more objects using a first camera with a first viewing angle of the electronic device and capturing a moved object among the one or more objects using a second camera with a second viewing angle of the electronic device.

According to various embodiments, there is provided a machine-readable storage medium recording a program to execute a method of capturing an image by an electronic device, the method comprising monitoring each of one or more objects using a first camera with a first viewing angle of the electronic device and capturing a moved object among the one or more objects using a second camera with a second viewing angle of the electronic device.

According to various embodiments, a method of capturing images by an electronic device and the electronic device allow an electronic device implemented as a robot to play a role as a human photographer. For example, the electronic device distinguishes the respective roles of different types of cameras, i.e., the first camera (e.g., a wide-angle camera or 360-degree camera), the second camera (e.g., a normal camera or a zooming lens-equipped camera), and the third camera (a normal camera or a zooming lens-equipped camera). For example, the electronic device uses the first camera for locating objects and the second camera and/or third camera for detailed capturing of one or more objects. Thus, the electronic device may obtain a natural image upon capturing one or more objects that have been relocated and may capture objects in a more rapid and noticeable manner as compared with conventional electronic devices. For example, the electronic device uses the first camera for locating objects and the second camera and third camera for detailed capturing of each object. Thus, the electronic device may obtain a natural image upon continuous shooting of multiple objects and may capture each of the multiple objects in a more rapid and noticeable manner as compared with conventional electronic devices.

Figure 1A:
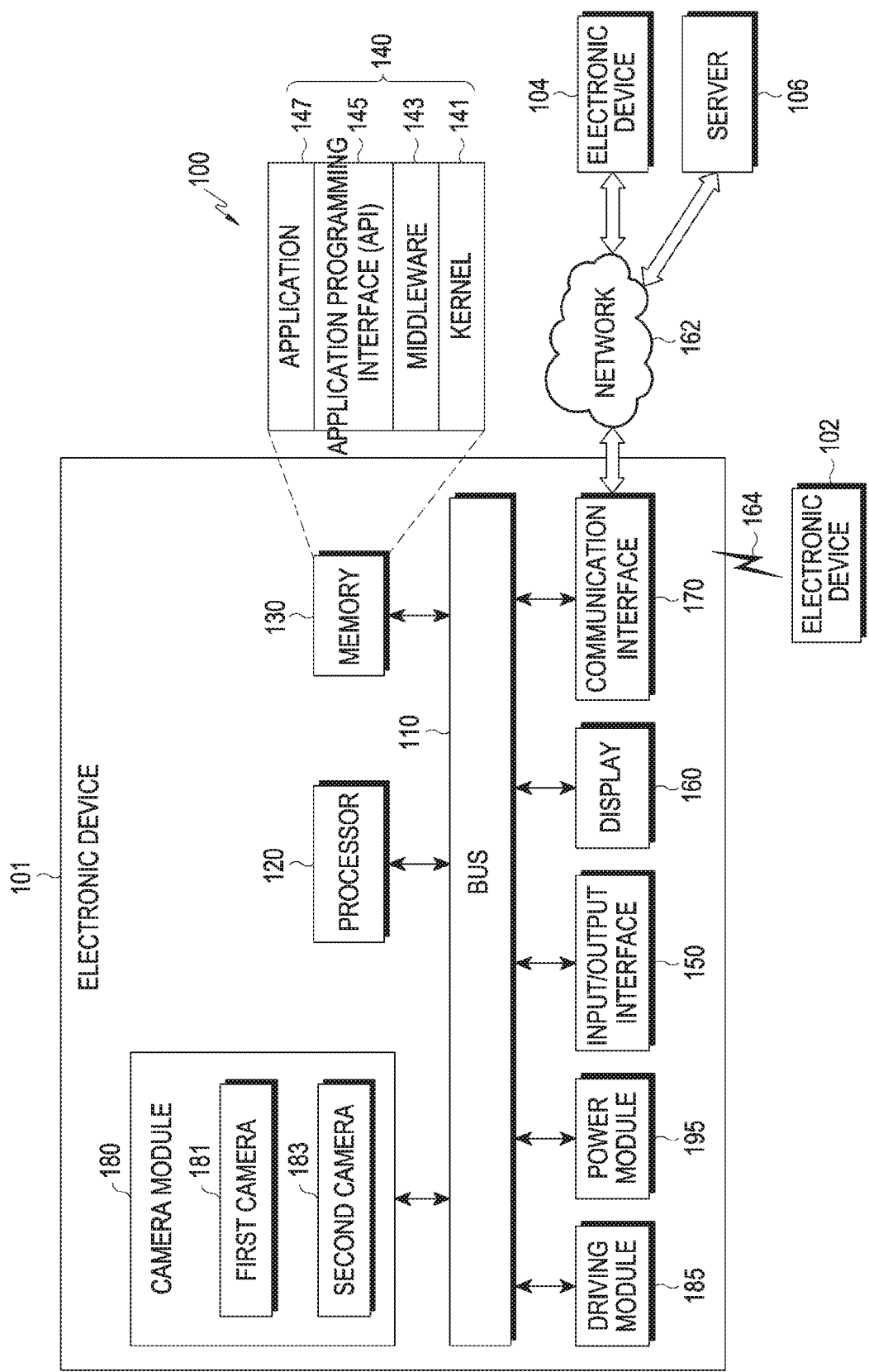
FIG. 1A is a block diagram illustrating an electronic device according to various embodiments.

DETAILED DESCRIPTION OF EXAMPLE
EMBODIMENTS

Hereinafter, embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a mobile medical device, a camera, or a wearable device. According to an embodiment of the present invention, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

In some embodiments, the electronic device may be a home appliance. Examples of the home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, electronic or gas meters, a sprinkler, a fire alarm, a thermostat, a street light, a toaster, fitness equipment, a hot water tank, a heater, or a boiler).

According to various embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves). According to various embodiments, the electronic device may be one or a combination of the above-listed devices. According to some embodiments, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1A is a block diagram illustrating an electronic device 101 according to various embodiments. The electronic device 101 may include a bus 110, a processor 120, a memory 130, an input/output interface 150, a display 160, a communication interface 170, a camera module 180, a driving module 185, and a power module 195. In some embodiments, the electronic device 101 may exclude at least one of the components or may add another component. The bus 110 may include a circuit for connecting the components 110 to 170 with one another and transferring communications (e.g., control messages or data) between the components. The processing module 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control.

For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user. For example, the communication interface 170 may set up communication between the electronic device 101 and an external device (e.g., a first electronic device 102, a second electronic device 104, or a server 106). For example, the communication interface 170 may be connected with a network 162 through wireless communication or wired communication and may communicate with an external device (e.g., the second external electronic device 104 or server 106).

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (Wi-Bro), or global system for mobile communication (GSM). According to an embodiment of the present invention, the wireless communication may include at least one of, e.g., wireless fidelity (Wi-Fi), Bluetooth, Bluetooth low power (BLE), ZigBee, near field communication (NFC), magnetic secure transmission (MST), radio frequency, or body area network (BAN). According to an embodiment of the present invention, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the electronic devices 102 and 104 or server 106). According to an embodiment, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

For example, the camera module 180 may be a device for recording still images and videos, and may include, according to an embodiment, one or more image sensors (e.g., front and back sensors), a lens, an Image signal processor (ISP), or a flash such as an LED or xenon lamp.

The camera module 180 may include, e.g., a plurality of cameras. For example, the camera module 180 may include one or more first cameras 181 with a first viewing angle and one or more second cameras 183 with a second viewing angle. For example, the first viewing angle may be a wide angle not less than a predesignated angle (e.g., 180 degrees), and the second viewing angle may be a predesignated viewing angle (e.g., from 40 degrees to 60 degrees) which is relatively narrower than the first viewing angle. For example, the first camera 181 may be a camera that may capture a wide area and generate a wide-angle image, such as a wide-angle camera or a 360-degree camera capable of 360-degree capturing. The wide-angle camera may be a camera including a wide-angle lens. The 360-degree camera may include a plurality of lenses and capture images for a plurality of different directions and may merge the images for the plurality of different directions into a single wide-angle image. The second camera 183 may be a camera with zooming functionality (e.g., zoom-in and/or zoom-out).

The driving module 185 may include one or more motors capable of moving at least part of mechanical components of the electronic device 101. The driving module 185 may be used to move the electronic device 101 or allow the mechanical components to move to thus mechanically vary. The driving module 185 may be in the form capable of moving up, down, left, or right with respect to at least one or more axes, and may be implemented to have various forms. For example, the one or more motors in the driving module 185 may be rotated under the control of the processor 120, and thus, the electronic device 101 may be moved and/or the mechanical components of the electronic device 101 may be moved. For example, the electronic device 101 may be implemented in the form of a robot, and each mechanical component, e.g., the main body, one or more arm parts, and/or one or more moving units (e.g., legs in various shapes, such as two-legged or four-legged, or one or more wheels), may have one or more motors which may be controlled by the processor 120, thus controlling the movement of each component.

The power module 195 may supply power that the electronic device 101 consumes.

Figure 1B:
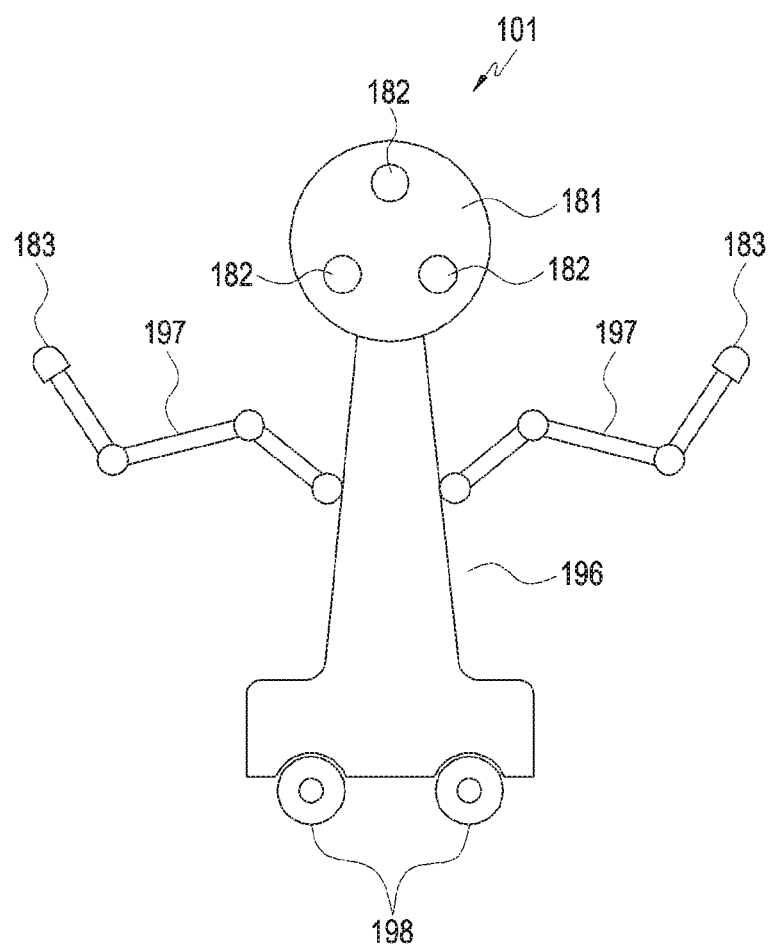
FIG. 1B is a view illustrating an example of implementation of an electronic device according to various embodiments.

FIG. 1B is a view illustrating an example of implementation of an electronic device 101 according to various embodiments.

The electronic device 101 may be implemented in the form of a robot as shown in FIG. 1B. The electronic device 101 may include a main body (body part) 196 and body parts 197.

A first camera 181 may be placed on the top of the main body 196. For example, the first camera 181 may be a 360-degree camera that includes a plurality of lenses 182 to generate a wide-angle image as shown in FIG. 1B.

The arm parts 197 placed on both sides of the main body 196 may include second cameras 183. The arm part 197 may be implemented as, e.g., an articulated robot arm (e.g., 6-axis articulated robot arm). The second camera 183 may be a camera that includes a lens with a relatively narrower viewing angle as compared with the first camera 181.

One or more wheels 198 may be placed on the bottom of the main body 196. The electronic device 101 may control one or more motors for moving the wheels 198 to move the electronic device 101.

According to an embodiment, in a range where an object to be captured using the second camera 183 does not depart off the angle of the first camera 181, the electronic device 101 may capture an image including the object without its movement. If the object moves, in a range where the moved object does not depart off the angle of the first camera 181, the first camera 181 may capture an image including the moved object without movement of the electronic device 101 and trace the moved position of the object.

According to an embodiment, if the object to be captured is off the angle of the first camera 181, the electronic device 101 may control the one or more motors for moving the one or more wheels 198 on the bottom of the main body 196 to move so that the object to be captured is positioned within the range of angle of the first camera 181.

According to an embodiment, the electronic device 101 may control at least one of the arm parts 197 placed on both sides of the main body 196 and/or the one or more motors for moving the one or more wheels 198 on the bottom of the main body 196 to move at least one arm part 197 of the electronic device and/or the electronic device, allowing the second camera 183 to face the object to be captured. For example, if the object is positioned off the zooming range of the zoom lens of the second camera 183, the electronic device 101 may control the one or more motors for moving the arm part 197 to move the electronic device or the arm part 197 of the electronic device closer to, or far away from, the object, thereby performing the same function as zooming.

Meanwhile, although in the embodiment of FIG. 1B, the first camera 181 is a 360-degree camera, the first camera 181 may be a wide-angle camera according to another embodiment.

Further, the robot-type implementation of the electronic device 101 is merely an example, and there are no limitations as to the type of implementation.

For example, according to the above-described embodiment of FIG. 1B, the electronic device 101 includes two arm parts 197, and each arm part 197 includes a second camera 183. However, according to another embodiment, the electronic device may be formed to have one arm part with a second camera (e.g., the second camera 183). According to another embodiment, the electronic device may include three or more arm parts with second cameras (e.g., the second camera 181).

For example, according to the above-described embodiment of FIG. 1B, the electronic device 101 moves using one or more wheels 198 on the bottom of the main body 110. However, according to other embodiments, the electronic device 101 may be implemented to adopt caterpillar track moving, leg moving (including two-legged or four-legged), flying, or moving on a predetermined rail.

Further, a mechanical component of the electronic device 101 controlling the movement of the electronic device 101 (e.g., the main body 110 of the electronic device 101) may be referred to as a moving unit. For example, the moving unit may come in various forms, such as a wheel (e.g., the wheel 198) and/or leg (including two-legged or four-legged).

Figure 2:
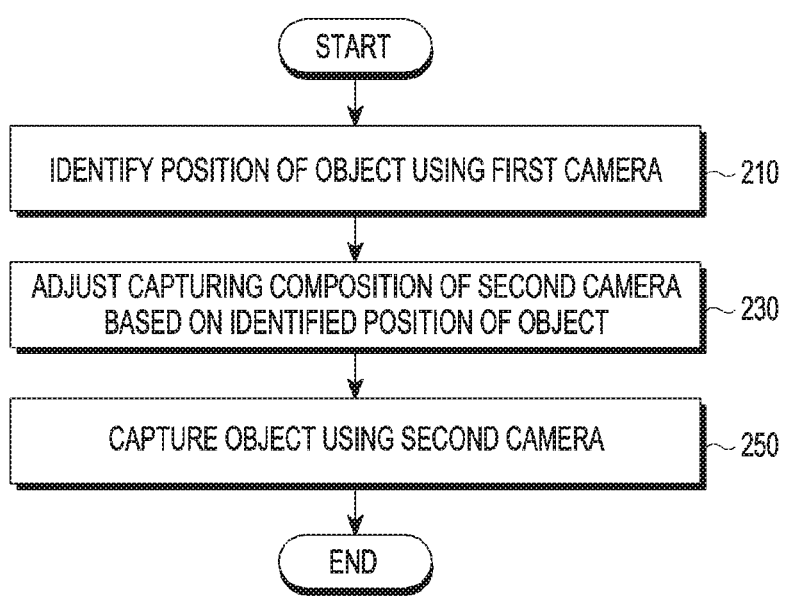
FIG. 2 is a flowchart illustrating an image capturing operation by an electronic device according to various embodiments.
Figure 3:
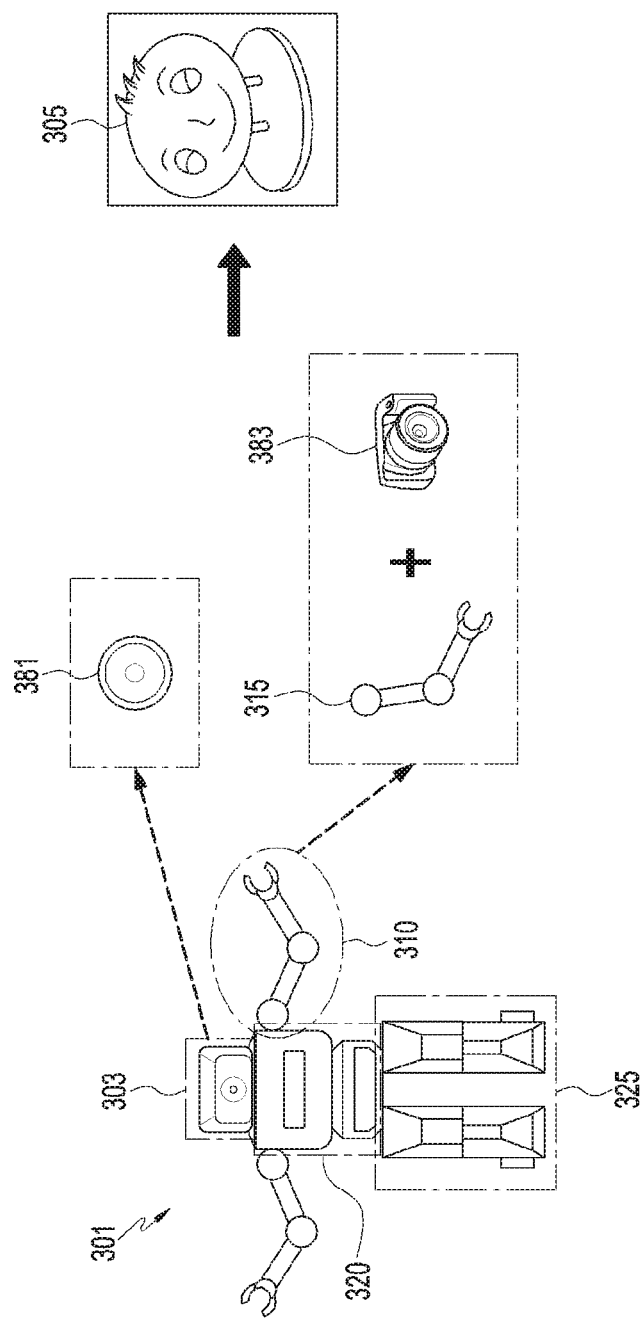
FIG. 3 is a view illustrating an image capturing operation by an electronic device according to various embodiments.

FIG. 2 is a flowchart illustrating an image capturing operation by an electronic device (e.g., the electronic device 101 or the processor 120 of the electronic device 101) according to various embodiments. FIG. 3 is a view illustrating an image capturing operation by an electronic device 301 (e.g., the electronic device 101 or the processor 120 of the electronic device 101) according to various embodiments.

Referring to FIGS. 2 and 3, an electronic device 301 may include a first camera 381 (e.g., the first camera 181) for searching for an object 305 to be captured and a second camera 383 (e.g., the second camera 183) for capturing the object 305 discovered by the first camera 381 and obtaining an image. For example, the electronic device 301 has the first camera 381 for searching for the target object 305 and the second camera 383 for capturing the object 305 discovered by the first camera 381 in a designated capturing composition separated from each other, and thus, the electronic device 301 may quickly find the target object 305 and naturally capture an image of the object 305.

According to an embodiment, the electronic device 301 may be in the form of a robot as shown in FIG. 3. For example, a head part 303 connected with the main body 320 (e.g., the main body 196) of the robot may have the first camera 381 (e.g., the first camera 181) placed thereon. The first camera 381 may be a camera that may capture a wide area and generate a wide-angle image, such as a wide-angle camera or a 360-degree camera capable of 360-degree capturing. For example, arm parts 310 (e.g., the arm parts 197) may be placed on the sides of the main body 320 of the robot. The arm part 310 may be a six-axis articulated robot arm 315 and may include a second camera 383 (e.g., the second camera 183). For example, the second camera 383 may be a camera with a relatively narrow viewing angle as compared with the first camera 381 and may have the zooming functionality.

In operation 210, the electronic device (e.g., the electronic device 101 or the processor 120 of the electronic device 101) may identify the position of an object using the first camera.

Referring to FIG. 3, the electronic device 301 may capture the image using the first camera 381 and identify the position of the object 305 by analyzing the captured image.

According to an embodiment, the object 305 may be a predesignated one or may be automatically determined by the electronic device 301 based on a designated condition.

For example, the electronic device 301 may analyze the captured image using the first camera 381 by face recognition or other various recognition techniques and may identify the position of the predetermined object 305 based on the results of image analysis.

As another example, the electronic device 301 may store information related to one or more objects, and the object-related information may include, e.g., the image and/or name (e.g., ID) corresponding to the object. Upon receiving a command to capture the object 305 of a first name via an input device (e.g., the input/output interface 150), e.g., a microphone, the electronic device 301 may identify the position of the object 305 corresponding to a stored object image from the image captured by the first camera 381 based on the stored object image.

As another example, the electronic device 301 may determine that a person detected from the image captured via the first camera 381 is the object 305 and identify the position of the object 305. For example, the electronic device 301 may detect the person's face from the image captured via the first camera 381 using a recognition technique, such as face recognition, and determine that the person with the detected face is the object 305.

As another example, the electronic device 301 may determine that a person issuing an utterance, upon capturing the image via the first camera 381, is the object 305 and identify the position of the object 305. For example, the electronic device 301 may include one or more microphones, and the electronic device may determine the direction of the utterance received via the microphone using a direction-of-arrival (DOA) estimation technique. The electronic device 301 may determine the person who has issued the utterance using a recognition technique, such as face recognition, based on the determined direction of utterance and determine that the determined person is the object 305. For example, the electronic device 101 may determine that the person located in the determined direction of utterance, recognized using the recognition technique, is the object 205.

In operation 230, the electronic device (e.g., the electronic device 101 or the processor 120 of the electronic device 101) may adjust the capturing composition of the second camera based on the identified position of object.

Referring to FIG. 3, the electronic device 301 may determine whether the second camera 383 needs to relocate to capture the object 305 based on the identified position of the object 305. For example, if the object 305 is positioned off a designated range of angle of the second camera 383, the electronic device 301 may determine that the second camera 383 needs to relocate. For example, if the object 305 is positioned within the designated range of angle of the second camera 383, the electronic device 301 may determine that the second camera 383 does not need to relocate.

According to an embodiment, unless the second camera 383 needs to relocate, the electronic device 301 may adjust the capturing composition of the second camera 383 based on the position of the object 305. The capturing composition may be, e.g., composing a screen by arranging objects in a frame.

According to an embodiment, the electronic device 301 may adjust the capturing composition of the second camera 383 by controlling, e.g., the direction of lens, focal length, and/or zooming of the second camera 383.

According to an embodiment, the electronic device 301 may adjust the capturing composition of the second camera 383 according to a designated capturing composition based on the identified position of the object 305.

For example, the electronic device 301 may adjust the capturing composition of the second camera 383 by setting the capturing composition of the second camera 383 so that the object 305 is located in a designated position (e.g., the center) of the image.

For example, the electronic device 301 may pre-designate and store a capturing composition applicable per designated capturing mode. For example, the electronic device 301 may pre-designate and store a composition per capturing mode, e.g., figure, landscape, or food photos. For example, the electronic device 301 may designate and store a different composition depending on the number of figures to be captured. For example, the electronic device 301 may designate and store a different composition depending on the type (e.g., ocean or mountain) of the landscape to be captured.

According to an embodiment, if the second camera 383 needs to relocate, the electronic device 305 may control the electronic device 301 and/or part (e.g., the arm part 310 and/or leg part 325 (e.g., wheel 198)) of the electronic device 301 to allow the second camera 383 to face the object 305 based on the identified position of the object 305. The electronic device 301 may adjust the capturing composition of the second camera 383 that faces the object 305 based on the identified position of the object 305.

For example, the electronic device 301 may drive one or more motors included in the electronic device 301 based on the position of the object 305 to allow the second camera 383 to face the object 305. For example, the electronic device 301 may drive the one or more motors included in the electronic device 301 to control the movement of the main body 320 of the electronic device 301, the movement of the leg part 325, and/or the movement of the arm part 310, thereby allowing the second camera 383 to face the object. For example, when the electronic device 301 controls to move only the arm part 310, but not the main body 320 and/or leg part 325, more smooth and precise control may be performed than when the electronic device 301 controls to move the main body 320 and/or the leg part 325.

In operation 250, the electronic device (e.g., the electronic device 101 or the processor 120 of the electronic device 101) may capture the object using the second camera.

Referring to FIG. 3, the electronic device 301 may capture an image of the object 305 using the capturing composition-adjusted second camera 383.

According to an embodiment, the electronic device 301 may noticeably capture the object using the second camera. For example, the electronic device 301 may automatically control the zooming function of the second camera 383, allowing the image of the object 305 to be enlarged in a designated size and captured.

According to an embodiment, before the above-described operation 210 of FIG. 2, the electronic device may be relocated to allow the first object and the second object to be easily identified for their position. For example, the electronic device may control to be moved based on the positions of the first object and the second object.

Meanwhile, although the operations of FIG. 2 have been described using the electronic device 301 of FIG. 3, the type of the electronic device 301 shown in FIG. 3 is an embodiment, and various changes may be made to the type of the electronic device, e.g., the electronic device 101 of FIG. 1B.

Figure 4:
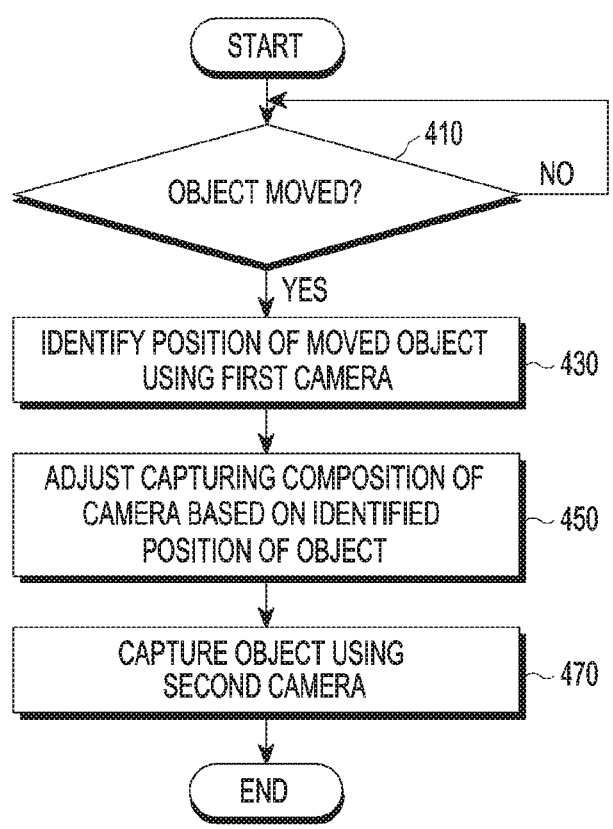
FIG. 4 is a flowchart illustrating an image capturing operation by an electronic device according to various embodiments.
Figure 5:
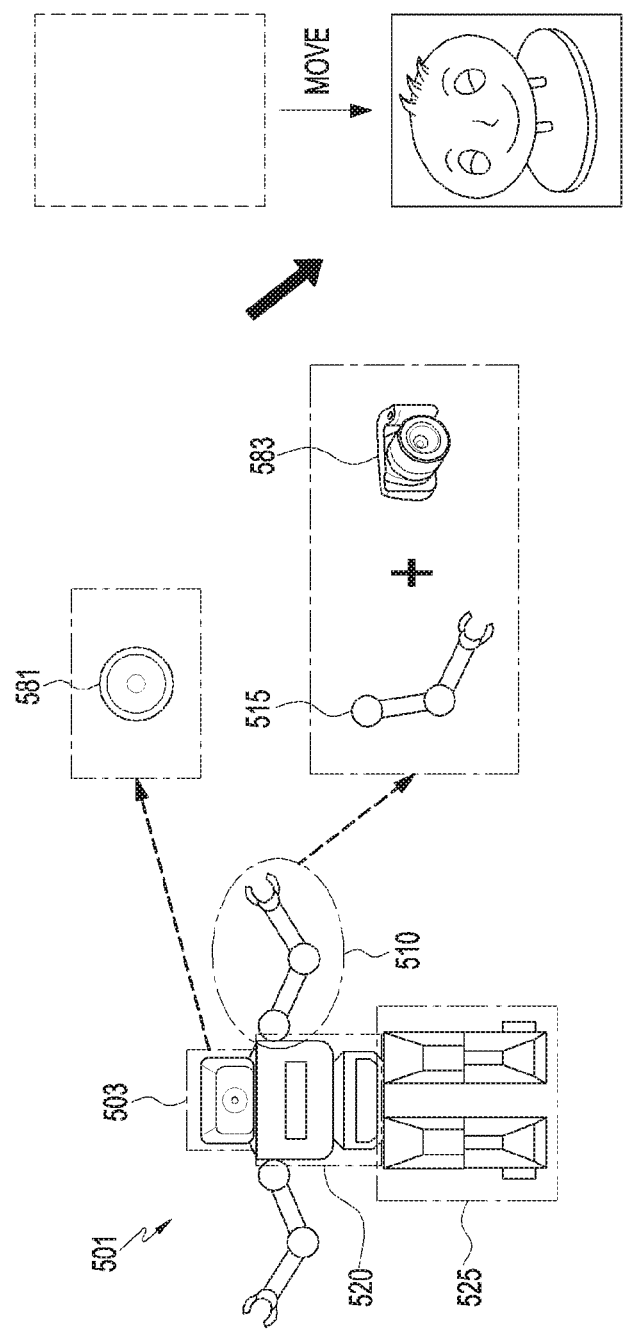
FIG. 5 is a view illustrating an image capturing operation by an electronic device according to various embodiments.

FIG. 4 is a flowchart illustrating an image capturing operation by an electronic device (e.g., the electronic device 101 or the processor 120 of the electronic device 101) according to various embodiments. FIG. 5 is a view illustrating an image capturing operation by an electronic device 501 (e.g., the electronic device 101 or the processor 120 of the electronic device 101) according to various embodiments.

Referring to FIGS. 4 and 5, an electronic device 501 may include a first camera 581 (e.g., the first camera 181) for searching for an object 505 to be captured and a second camera 583 (e.g., the second camera 183) for capturing the object 505 discovered by the first camera 581 and obtaining an image. For example, the electronic device 501 may grasp the position of the object 505 using the first camera 581 and, in real-time or periodically, monitor the object 505 using the second camera 583. For example, even when the object 505 is moved, the first camera 581 may perform real-time or periodic monitoring on the position of the object 505. To capture the object 505, the electronic device 501 may allow the second camera 583 to face the object 505 based on the position of the object 505 identified via the first camera and adjust the capturing composition of the second camera 583 and capture the object 505. For example, the electronic device 501 may move at least part of the electronic device 501 to allow the second camera 583 to face the object 505. Thus, issues raised when the conventional electronic device captures an object, such as failure to locate the object due to the object moving off the angle of the camera of the electronic device, may be addressed.

According to an embodiment, the electronic device 501 may be in the form of a robot as shown in FIG. 5. For example, a head part 503 connected with the main body 520 (e.g., the main body 196) of the robot may have a first camera 581 (e.g., the first camera 181) placed thereon. The first camera 581 may be a camera that may capture a wide area and generate a wide-angle image, such as a wide-angle camera or a 360-degree camera capable of 360-degree capturing. For example, arm parts 510 (e.g., the arm parts 197) may be placed on the side surfaces of the main body 520 of the robot. The arm part 510 may be a six-axis articulated robot arm 515 and may include a second camera 583 (e.g., the second camera 183). For example, the second camera 583 may be a camera with a relatively narrow viewing angle as compared with the first camera 381 and may have the zooming functionality.

In operation 410, the electronic device (e.g., the electronic device 101 or the processor 120 of the electronic device 101) may determine whether the object has been moved.

Referring to FIG. 5, the electronic device 501 may monitor the object 505 using the first camera 581, in real-time or every designated time interval. For example, the electronic device 501 may capture the object 505 using the first camera 581 and monitoring and identify the position of the object 505 by analyzing the captured image.

According to an embodiment, the electronic device 501 may determine whether the object 505 has been moved while monitoring the object 505. For example, within a range in which the object 505 does not depart off the angle when the electronic device identifies a relocation of the object 505, the first camera 581 for searching for the object 501 may trace the position of the moving object 505 without moving the electronic device 501 and/or part (e.g., the arm part 510 and/or leg part 525 (e.g., the wheel 198)) of the electronic device 501. As another example, upon identifying a relocation of the object 505, if the object 500 departs off the angle, the first camera 581 for searching for the object 501 may move the electronic device 501 and/or part of the electronic device 501 and trace the position of the moving object 505.

Upon determining that the object has been moved in operation 410, the electronic device may perform operation 420 and, otherwise, re-perform operation 410.

In operation 430, the electronic device (e.g., the electronic device 101 or the processor 120 of the electronic device 101) may identify the position of the moved object using the first camera 581.

Referring to FIG. 5, the electronic device 501 may identify the position of the moved object 505 by analyzing the image captured by the first camera 581.

In operation 450, the electronic device (e.g., the electronic device 101 or the processor 120 of the electronic device 101) may adjust the capturing composition of the second camera based on the identified position of object.

Referring to FIG. 5, the electronic device 501 may determine whether the second camera 583 needs to relocate to capture the object 505 based on the identified position of the object 505.

According to an embodiment, unless the second camera 583 needs to relocate, the electronic device 501 may adjust the capturing composition of the second camera 583 based on the identified position of the object 505.

According to an embodiment, if the second camera 583 needs to relocate, the electronic device 505 may control to move the electronic device 501 and/or part (e.g., the arm part 510 and/or leg part 525 (e.g., wheel 505)) of the electronic device 501 to allow the second camera 583 to face the object 505 based on the identified position of the object 505 and may adjust the capturing composition of the second camera 583 facing the object 505, based on the identified position of the object 505.

In operation 470, the electronic device (e.g., the electronic device 101 or the processor 120 of the electronic device 101) may capture the object using the second camera.

Referring to FIG. 5, the electronic device 501 may capture an image of the object 505 using the capturing composition-adjusted second camera 583.

According to an embodiment, before the above-described operation 410 of FIG. 4, the electronic device may be relocated to allow the first object and the second object to be easily identified for their position. For example, the electronic device may control to be moved based on the positions of the first object and the second object.

Meanwhile, although the operations of FIG. 4 have been described using the electronic device 501 of FIG. 5, the type of the electronic device 501 shown in FIG. 5 is an embodiment, and various changes may be made to the type of the electronic device, e.g., the electronic device 101 of FIG. 1B.

Figure 6:
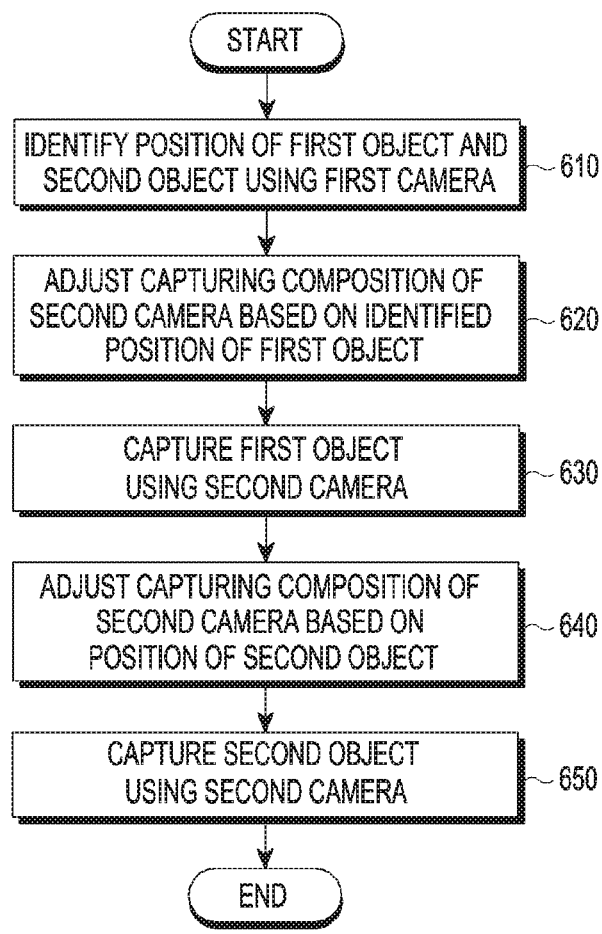
FIG. 6 is a flowchart illustrating an image capturing operation by an electronic device according to various embodiments.

FIG. 6 is a flowchart illustrating an image capturing operation by an electronic device (e.g., the electronic device 101 or the processor 120 of the electronic device 101) according to various embodiments.

Referring to FIG. 6, the electronic device may include a first camera (e.g., the first camera 181) for searching for a plurality of target objects and a second camera (e.g., the second camera 183) for capturing each of the objects discovered by the first camera and obtaining an image.

According to an embodiment, if there is a plurality of objects, the electronic device may identify the positions of the plurality of objects while capturing a first object so as to identify the position of the first object using the first camera. For example, the electronic device may adjust the capturing composition of the second camera based on the identified position of the first object and execute the operation of capturing the first object using the second camera while monitoring the position of the second object using the first camera. Thus, when the electronic device sequentially captures the plurality of objects, the electronic device may perform no separate operation of identifying the position of the second object using the first camera after capturing the first object using the second camera. For example, the electronic device may adjust the capturing composition of the second camera based on the position of the second object monitored while executing the operations for capturing the first object and execute the operation of capturing the first object using the second camera.

In operation 610, the electronic device (e.g., the electronic device 101 or the processor 120 of the electronic device 101) may identify the positions of the first object and the second object using the first camera.

According to an embodiment, the electronic device may capture an image including the first object and the second object using the first camera and may identify the positions of the first object and second object by analyzing the captured image.

In operation 620, the electronic device (e.g., the electronic device 101 or the processor 120 of the electronic device 101) may adjust the capturing composition of the second camera based on the identified position of first object.

According to an embodiment, the electronic device may determine whether the second camera needs to relocate to capture the first object based on the identified position of the first object.

According to an embodiment, unless the second camera needs to relocate, the electronic device may adjust the capturing composition of the second camera based on the position of the first object.

According to an embodiment, if the second camera needs to relocate, the electronic device may control to move the electronic device and/or part of the electronic device to allow the second camera to face the first object based on the identified position of the first object and may adjust the capturing composition of the second camera facing the first object based on the identified position of the first object.

In operation 630, the electronic device (e.g., the electronic device 101 or the processor 120 of the electronic device 101) may capture the first object using the second camera.

According to an embodiment, the electronic device may capture an image of the first object using the capturing composition-adjusted second camera.

According to an embodiment, while performing the above-described operation 620 and/or operation 630, the electronic device may monitor (continue to identify) the position of the second object. For example, the electronic device may monitor the position of the second object using the second camera.

In operation 640, the electronic device (e.g., the electronic device 101 or the processor 120 of the electronic device 101) may adjust the capturing composition of the second camera based on the position of the second object.

According to an embodiment, the electronic device may determine whether the second camera needs to relocate to capture the second object based on the position of the second object identified by the first camera.

According to an embodiment, unless the second camera needs to relocate, the electronic device may adjust the capturing composition of the second camera based on the position of the second object.

According to an embodiment, if the second camera needs to relocate, the electronic device may control to move the electronic device and/or part of the electronic device to allow the second camera to face the second object based on the position of the second object and may adjust the capturing composition of the second camera facing the second object based on the position of the second object.

In operation 650, the electronic device (e.g., the electronic device 101 or the processor 120 of the electronic device 101) may capture the second object using the second camera.

According to an embodiment, the electronic device may capture an image of the second object using the capturing composition-adjusted second camera.

Although in the embodiment of FIG. 6 described above, e.g., the first object and the second object are sequentially captured, three or more objects may be sequentially captured according to another embodiment. For example, all of the plurality of objects may be identified using the first camera, and then, the capturing composition of the second camera may be adjusted for each of the target objects and the capturing operations may be sequentially performed. For example, for each of the target objects, the electronic device may adjust the capturing composition of the second camera and perform the capturing operation while monitoring the position of each target object using the first camera.

According to an embodiment, the order of capturing the plurality of objects may be pre-designated or may be determined by the electronic device according to a designated condition. For example, the order of capturing the plurality of objects may be automatically determined by the electronic device based on an image captured by the electronic device via the first camera. For example, the order of capturing may be determined to perform capturing to the right from the leftmost object in the captured image, to the left from the rightmost object in the captured image, to the bottom from the uppermost object in the captured image, or to the top from the lowermost object in the captured image.

According to an embodiment, before the above-described operation 610 of FIG. 6, the electronic device may be relocated to allow the first object and the second object to be easily identified for their position. For example, the electronic device may control to be moved based on the positions of the first object and the second object.

Figure 7:
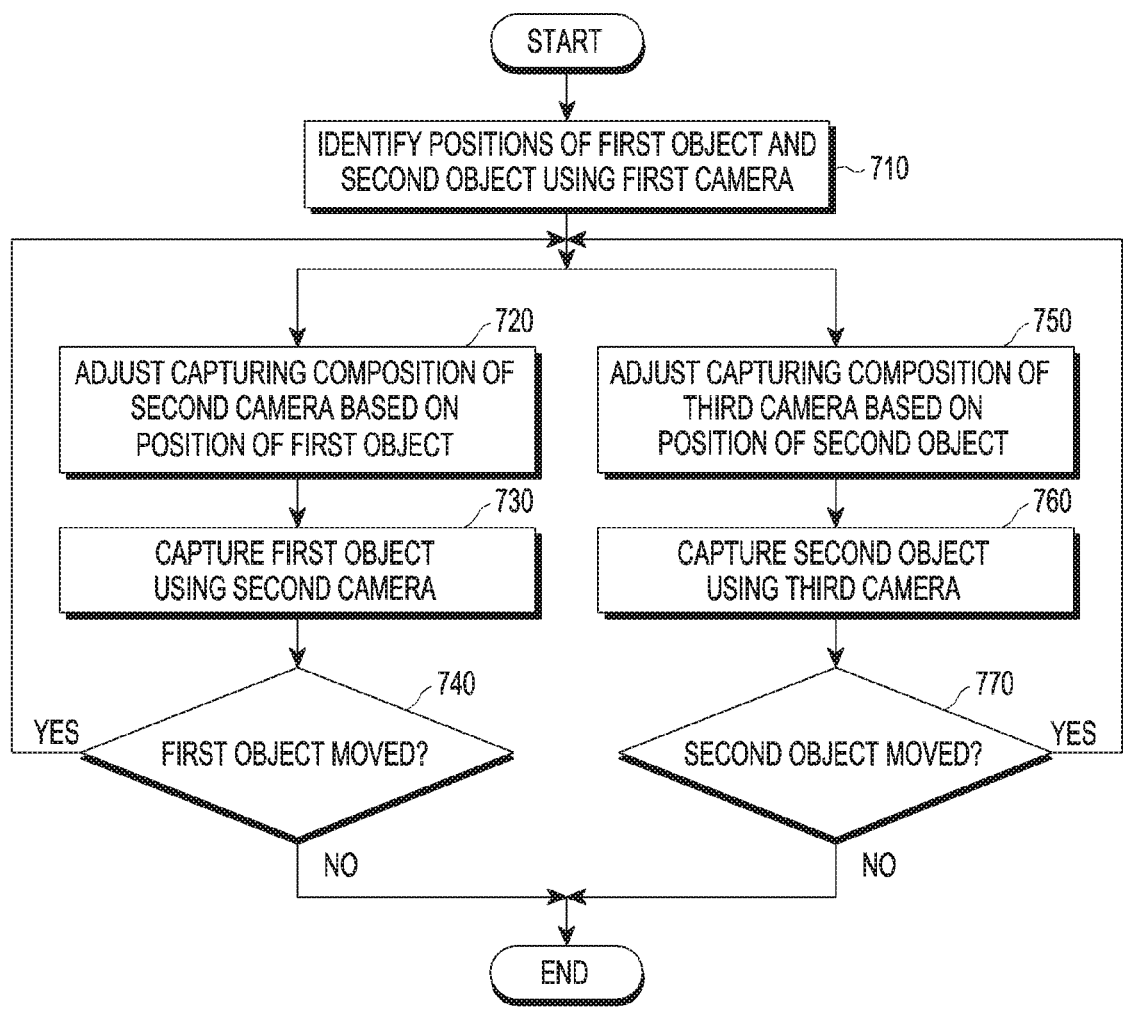
FIG. 7 is a flowchart illustrating an image capturing operation by an electronic device according to various embodiments.
Figure 8A:
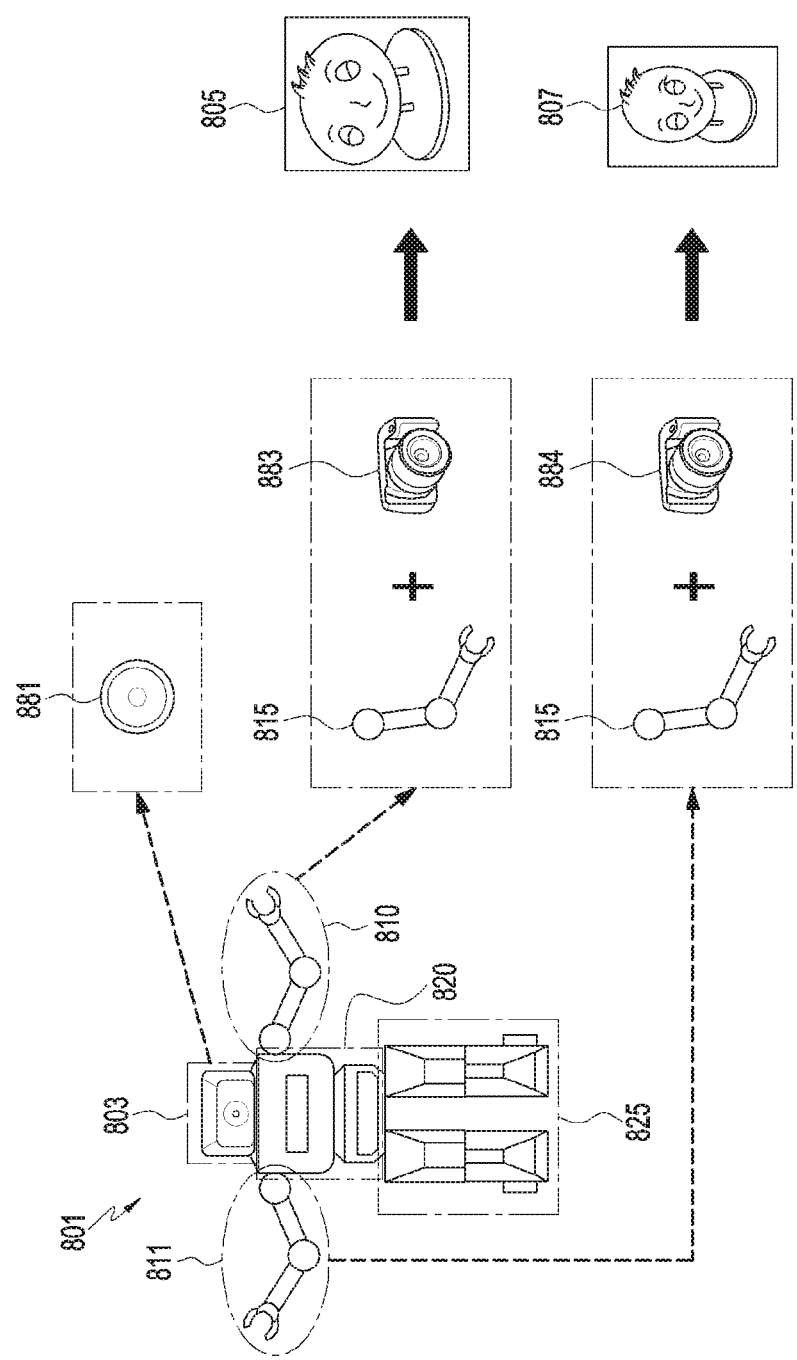
FIGS. 8A and 8B are views illustrating an image capturing operation by an electronic device according to various embodiments.
Figure 8B:
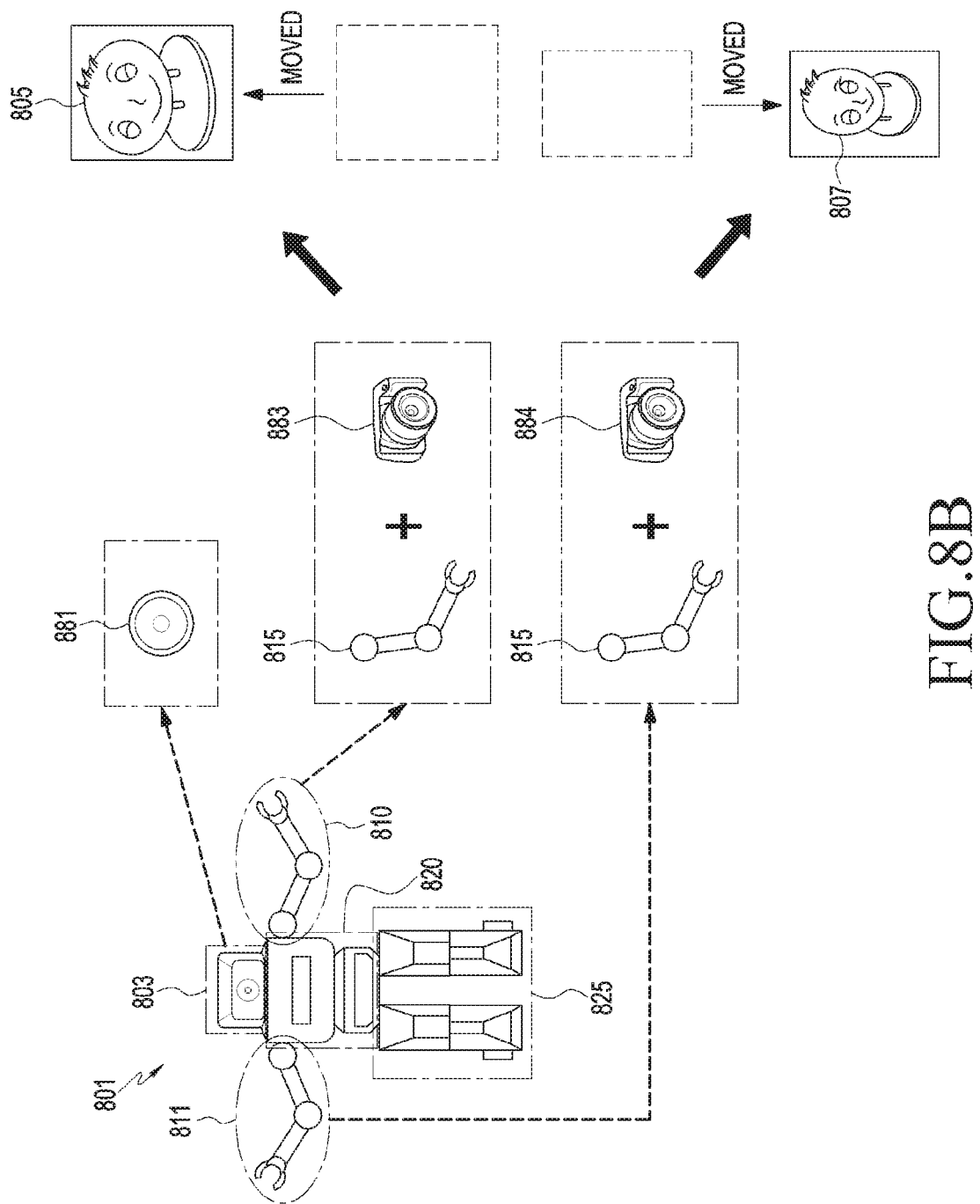

FIG. 7 is a flowchart illustrating an image capturing operation by an electronic device (e.g., the electronic device 101 or the processor 120 of the electronic device 101) according to various embodiments. FIGS. 8A and 8B are views illustrating an image capturing operation by an electronic device 801 (e.g., the electronic device 101 or the processor 120 of the electronic device 101) according to various embodiments.

Referring to FIGS. 7, 8A and 8B, an electronic device 801 may include a first camera 881 (e.g., the first camera 181) for searching for a first object 805 and second object 807 to be captured, a second camera 883 (e.g., the second camera 183) for capturing the first object 805 discovered by the first camera 881 and obtaining an image, and a third camera 884 (e.g., the second camera 183) for capturing the second object 807 discovered by the first camera 881 and obtaining an image.

According to an embodiment, the electronic device 801 may be in the form of a robot as shown in FIGS. 8A and 8B. For example, a head part 803 of the robot may have a first camera 881 (e.g., the first camera 181) placed thereon. The first camera 881 may be a camera that may capture a wide area and generate a wide-angle image, such as a wide-angle camera or a 360-degree camera capable of 360-degree capturing. For example, a first arm part 810 (e.g., the arm part 197) and a second arm part 811 (e.g., the arm part 197) may be placed on both sides of the main body 820 (e.g., the main body 196), and the first arm part 810 and the second arm part 811 may be six-axis articulated robot arms 815. The first arm part 810 may include a second camera 883 (e.g., the second camera 183), and the second arm part 811 may include a third camera 884 (e.g., the second camera 183). For example, the second camera 883 and the third camera 884 may be cameras with a relatively narrow viewing angle as compared with the first camera 881 and may have the zooming functionality.

According to an embodiment, the electronic device 801 may simultaneously capture the first object 805 and the second object 807 using the second camera 883 and the third camera 884, respectively, based on the positions of the first object 805 and the second object 807 identified using the first camera 881. For example, the electronic device 810 may monitor the first object 805 and the second object 807 using the first camera 881. If the first object 805 and/or the second object 807 are relocated (moved) while monitoring the first object 805 and the second object 807, the electronic device may identify the moved position of the first object 805 and/or second object 807 using the first camera 881. The electronic device may control to move the electronic device and/or part of the electronic device (e.g., the first arm part 810, the second arm part 811, and/or the leg part 825 (e.g., the wheel 198)) to allow the second camera 883 and/or the third camera 884 to face the moved first object 805 and/or second object 807, respectively, based on the moved positions of the first object 805 and/or the second object 807 and, thus, the electronic device may capture the moved first object 805 using the second camera 883 and/or the moved second object 807 using the third camera 884.

In operation 710, the electronic device (e.g., the electronic device 101 or the processor 120 of the electronic device 101) may identify the positions of the first object and the second object using the first camera.

Referring to FIG. 8A, the electronic device 801 may capture an image including the first object 805 and second object 807 using the first camera 881 and may identify the positions of the first object 805 and the second object 807 by analyzing the captured image.

In operation 720, the electronic device (e.g., the electronic device 101 or the processor 120 of the electronic device 101) may adjust the capturing composition of the second camera based on the position of the first object.

Referring to FIG. 8A, the electronic device 801 may determine whether the second camera 883 needs to relocate to capture the first object 805 based on the position of the first object 805 identified using the first camera 881.

According to an embodiment, unless the second camera 883 needs to relocate, the electronic device 801 may adjust the capturing composition of the second camera 883 based on the position of the first object 805 identified using the first camera 881.

According to an embodiment, if the second camera 883 needs to relocate, the electronic device 801 may control to move the electronic device 801 and/or part (e.g., the first arm part 810 and/or leg part 825) of the electronic device 801 to allow the second camera 883 to face the first object 805 based on the position of the first object 805 identified using the first camera 881 and may adjust the capturing composition of the second camera 883 facing the first object 805, based on the position of the first object 805.

In operation 730, the electronic device (e.g., the electronic device 101 or the processor 120 of the electronic device 101) may capture the first object using the second camera.

Referring to FIG. 8A, the electronic device 801 may capture an image of the first object 805 using the capturing composition-adjusted second camera 883.

In operation 740, the electronic device (e.g., the electronic device 101 or the processor 120 of the electronic device 101) may determine whether the first object has been moved using the first camera.

According to an embodiment, the electronic device 801 may monitor the first object 805 (identify the position of the first object) in real-time or every designated interval. For example, while performing the above-described operation 720 and/or operation 730, the electronic device 801 may monitor the position of the first object 805. For example, the electronic device 801 may capture an image using the first camera 881 and determine whether the first object 805 has moved by analyzing the captured image.

Referring to FIG. 8B, for example, within a range in which the first object 805 does not depart off the angle of the first camera 881 for searching for the first object 805 when the first object 805 is moved, the electronic device 801 may trace the moved position of the first object 805 without moving the electronic device 801 and/or part of the electronic device 801 (e.g., the first arm part 810, second arm part 811, and/or leg part 825). As another example, if the first object 805 departs off the angle of the first camera 881 for searching for the first object 805 when the first object 805 is moved, the electronic device 801 may control to move the electronic device 801 and/or part of the electronic device 801 and trace the moved position of the first object 805.

Upon determining that the first object has been moved in operation 740, the electronic device may perform operation 720 and, otherwise, terminate the operations of the present invention.

In operation 750, the electronic device (e.g., the electronic device 101 or the processor 120 of the electronic device 101) may adjust the capturing composition of the third camera based on the position of the second object.

According to an embodiment, the electronic device 801 may determine whether the third camera 884 needs to relocate to capture the second object 807 based on the position of the second object 807 identified using the first camera 881.

According to an embodiment, unless the third camera 884 needs to relocate, the electronic device 801 may adjust the capturing composition of the third camera 884 based on the position of the second object 807 identified using the first camera 881.

According to an embodiment, if the third camera 884 needs to relocate, the electronic device 801 may control to move the electronic device 801 and/or part (e.g., the second arm part 811 and/or leg part 825) of the electronic device 801 to allow the third camera 884 to face the second object 807 based on the identified position of the second object 807 and may adjust the capturing composition of the second camera 884 facing the second object 807, based on the position of the second object 807.

In operation 760, the electronic device (e.g., the electronic device 101 or the processor 120 of the electronic device 101) may capture the second object using the third camera.

According to an embodiment, the electronic device 801 may capture an image of the second object 807 using the capturing composition-adjusted third camera 884.

In operation 770, the electronic device (e.g., the electronic device 101 or the processor 120 of the electronic device 101) may determine whether the second object has been moved using the first camera.

According to an embodiment, the electronic device 801 may monitor (identify) the position of the second object 807 in real-time or every designated interval. For example, while performing the above-described operation 750 and/or operation 760, the electronic device 801 may monitor the position of the second object 807. For example, the electronic device 801 may capture an image using the first camera 881 and determine whether the second object 807 has moved by analyzing the captured image.

Referring to FIG. 8B, for example, within a range in which the second object 807 does not depart off the angle of the first camera 881 for searching for the second object 807 when the second object 807 is moved, the electronic device 801 may trace the moved position of the second object 807 without moving the electronic device 801 and/or part of the electronic device 801. As another example, if the second object 807 departs off the angle of the first camera 881 for searching for the second object 807 when the second object 807 is moved, the electronic device 801 may control to move the electronic device 801 and/or part of the electronic device 801 and trace the moved position of the second object 807.

Upon determining that the second object has been moved in operation 770, the electronic device may perform operation 750 and, otherwise, terminate the operations of the present invention.

In the above-described embodiments of FIGS. 7, 8A, and 8B, the electronic device 801 captures the first object 805 and the second object 807 using the second camera 883 and the third camera 884, respectively. However, according to other embodiments, the electronic device 801 may capture a first group of objects using the second camera 883 and a second group of objects using the third camera 883. For example, the electronic device 801 may identify the positions of the first group of objects and the second group of objects using the first camera 881 and may capture the first group of objects and the second group of objects using the second camera 883 and the third camera 884, respectively, based on the positions of the first group of objects and the second group of objects identified using the first camera 881. For example, when two or more objects move in group while facing each other or have a meeting in a conference room or have a family gathering in the living room, an embodiment using the above-described first camera 881, second camera 883, and third camera 884 may be utilized.

According to an embodiment, before the above-described operation 710 of FIG. 7, the electronic device may be relocated to allow the first object and the second object to be easily identified for their position. For example, the electronic device may control to be moved based on the positions of the first object and the second object.

Although the operations of FIG. 7 have been described using the electronic device 801 of FIGS. 8A and 8B, the type of the electronic device 801 shown in FIGS. 8A and 8B is an embodiment, and various changes may be made to the type of the electronic device, e.g., the electronic device 101 of FIG. 1B.

Meanwhile, one or more images captured and obtained in the above-described embodiments may be output through the display (e.g., the display 160) of the electronic device or transmitted to an external electronic device (e.g., the electronic device 104 or server 106) via the communication interface (e.g., the communication interface 170) of the electronic device.

According to various embodiments, an electronic device (e.g., the electronic device 101) may comprise a first camera (e.g., the first camera 181) with a first viewing angle, a second camera (e.g., the second camera 183) with a second viewing angle, and a processor (e.g., the processor 120) configured to monitor each of one or more objects using the first camera and capture a moved object among the one or more objects using the second camera.

According to various embodiments, the processor may be configured to identify a position of the one or more objects using the first camera, capture each of the one or more objects using the second camera based on the identified position of the one or more objects and, upon identifying a relocation of the one or more objects while monitoring each of the one or more objects, capture the moved object using the second camera based on the position of the moved object.

According to various embodiments, the processor may be configured to capture an image including the one or more objects using the first camera and identify the position of the one or more objects by analyzing the captured image.

According to various embodiments, the processor may be configured to adjust a capturing composition of the second camera according to a designated capturing composition based on the identified position of the one or more objects, and upon identifying the relocation of the one or more objects while monitoring the position of each of the one or more objects, adjust the capturing composition of the second camera according to the designated capturing composition based on the position of the moved object.

According to various embodiments, the processor may be configured to identify an order of capturing a first object and a second object included in the one or more objects obtained by the first camera and sequentially capture the first object and the second object using the second camera according to the identified order of capturing.

According to various embodiments, the processor may be configured to adjust the capturing composition of the second camera according to the designated capturing composition based on a position of the first object, capture the first object, and then adjust the capturing composition of the second camera according to the designated capturing composition based on the position of the second object, and capture the second object.

According to various embodiments, the electronic device may further comprise a main body (e.g., the main body 196 or main body 320), a first arm part (e.g., the arm part 197 or arm part 310) connected with the main body and having the second camera placed thereon, and a driving module (e.g., the driving module 185) including one or more motors for controlling a movement of the first arm part. The processor may be configured to control the driving module to relocate the second camera based on the position of the moved object to capture the moved object.

According to various embodiments, the electronic device may further comprise a third camera with the second view angle. The one or more objects may include a first object. The processor may be configured to, upon identifying a position of the first object using the first camera, identify a position of a second object using the first camera, capture the second object using the third camera based on the identified position of the second object, upon monitoring the first object using the first camera, monitor the second object using the first camera, and upon identifying a relocation of the second object while monitoring the second object, capture the moved third object using the third camera based on the position of the moved second object.

According to various embodiments, the processor may be configured to adjust a capturing composition of the third camera according to a designated capturing composition based on the identified position of the second object and upon identifying a relocation of the second object while monitoring the second object, adjust the capturing composition of the third camera according to the designated capturing composition based on the position of the moved second object.

According to various embodiments, the electronic device may further comprise a main body (e.g., the main body 196 or main body 320), a first arm part (e.g., the first arm part 197 or the first arm part 310) connected with the main body and having the second camera placed thereon, and a driving module (e.g., the driving module 185) including one or more motors for controlling a movement of the first arm part. The processor may be configured to determine whether a relocation of the second camera is needed based on the position of the moved first object and if the relocation of the second camera is needed, control the driving module based on the position of the moved first object to move the first arm part to relocate the second camera.

According to various embodiments, the electronic device may further comprise a second arm part (e.g., the first arm part 197 or the first arm part 310) connected with the main body and having the third camera placed thereon. The processor may be configured to determine whether a relocation of the third camera is needed based on the position of the moved second object and if the relocation of the third camera is needed, control the driving module based on the position of the moved second object to move the second arm part to relocate the third camera.

According to various embodiments, the electronic device may further comprise a moving unit (e.g., the wheel 198 or leg part 325) connected with the main body and configured to control a movement of the main body. The processor may be configured to, when at least one of the second camera or the third camera needs to be relocated, control the driving module to move the moving unit based on at least one of the position of the moved first object or the position of the moved second object to relocate at least one of the second camera or the third camera.

According to various embodiments, the first camera may include a wide-angle camera with a wide-angle lens or a plurality of lenses (e.g., the lens 182) and include a 360-degree camera (e.g., the first camera 181) configured to capture an image for a plurality of different directions to generate one wide-angle image.

According to various embodiments, the first viewing angle may be larger than the second viewing angle.

A method of capturing an image by an electronic device (e.g., the electronic device 101) may comprise monitoring each of one or more objects using a first camera (e.g., the first camera 181) with a first viewing angle of the electronic device, and capturing a moved object among the one or more objects using a second camera (e.g., the second camera 183) with a second viewing angle of the electronic device.

According to various embodiments, the method may further comprise identifying the position of the one or more objects using the first camera and capturing each of the one or more objects using the second camera based on the identified position of the one or more objects. Capturing the moved object among the one or more objects using the second camera may include, upon identifying a relocation of the one or more objects while monitoring each of the one or more objects, capturing the moved object using the second camera based on the position of the moved object.

According to various embodiments, identifying the position of the one or more objects using the first camera may include capturing an image including the one or more objects using the first camera and identifying the position of the one or more objects by analyzing the captured image.

According to various embodiments, capturing each of the one or more objects using the second camera based on the identified position of the one or more objects may include identifying an order of capturing a first object and a second object included in the one or more objects obtained by the first camera and sequentially capturing the first object and the second object using the second camera according to the identified order of capturing.

According to various embodiments, the one or more objects may include a first object. The method may further comprise, upon identifying a position of the first object using the first camera, identifying a position of a second object using the first camera, capturing the second object using a third camera with the second viewing angle based on the identified position of the second object, upon monitoring the first object using the first camera, monitoring the second object using the first camera, and upon identifying a relocation of the second object while monitoring the second object, capturing the moved third object using the third camera based on the position of the second object identified to have moved.

According to various embodiments, there may be provided a machine-readable storage medium recording a program to execute a method of capturing an image by an electronic device (e.g., the electronic device 101), the method comprising monitoring each of one or more objects using a first camera (e.g., the first camera 181) with a first viewing angle of the electronic device, and capturing a moved object among the one or more objects using a second camera (e.g., the second camera 183) with a second viewing angle of the electronic device.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Various embodiments as set forth herein may be implemented as software (e.g., the program 140) containing commands that are stored in a machine (e.g., computer)-readable storage medium (e.g., an internal memory 136) or an external memory 138. The machine may be a device that may invoke a command stored in the storage medium and may be operated as per the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

What is claimed is:

1. An electronic device, comprising:
a first camera with a first viewing angle;
a second camera with a second viewing angle;
a main body;
a moving unit including one or more wheels placed on the bottom of the main body and one or more motors for moving the one or more wheels;
a first arm part connected with the main body and having the second camera placed thereon;
a driving module including one or more motors for controlling a movement of the first arm part; and
a processor configured to monitor each of one or more objects using the first camera, determine whether each of the one or more objects has been moved while monitoring each of the one or more objects, identify an order of the capturing moved objects among the one or more objects obtained by the first camera, and sequentially capture the moved objects among the one or more objects using the second camera based on a relocation of the one or more objects while monitoring each of the one or more objects according to the identified order of capturing,
wherein the order of capturing is identified to perform capturing to one side from the other side, and
wherein the processor is configured to control the driving module to relocate the second camera based on the position of the moved objects to capture the moved objects without movement of the main body, if the moved objects are positioned within the first viewing angle of the first camera, and control the moving unit to move the main body so that the moved objects are positioned within the first viewing angle of the first camera, if the moved objects are positioned off the first viewing angle of the first camera.

2. The electronic device of claim 1, wherein the processor is configured to identify a position of the one or more objects using the first camera, capture each of the one or more objects using the second camera based on the identified position of the one or more objects, and capture the moved objects using the second camera based on the position of the moved objects.

3. The electronic device of claim 2, wherein the processor is configured to capture an image including the one or more objects using the first camera and identify the position of the one or more objects by analyzing the captured image.

4. The electronic device of claim 2, wherein the processor is configured to adjust a capturing composition of the second camera according to a designated capturing composition based on the identified position of the one or more objects, and, upon identifying the relocation of the one or more objects while monitoring the position of each of the one or more objects, adjust the capturing composition of the second camera according to the designated capturing composition based on the position of the moved objects.

5. The electronic device of claim 1, wherein the processor is configured to adjust a capturing composition of the second camera according to a designated capturing composition based on a position of the first object, capture a first object, and then adjust the capturing composition of the second camera according to the designated capturing composition based on a position of a second object, and capture the second object.

6. The electronic device of claim 1, further comprising a third camera with the second viewing angle, wherein the one or more objects include a first object, and wherein the processor is configured to, upon identifying a position of the first object using the first camera, identify a position of a second object using the first camera, capture the second object using the third camera based on the identified position of the second object, upon monitoring the first object using the first camera, monitor the second object using the first camera, and upon identifying a relocation of the second object while monitoring the second object, capture the moved second object using the third camera based on the position of the moved second object.

7. The electronic device of claim 6, wherein the processor is configured to adjust a capturing composition of the third camera according to a designated capturing composition based on the identified position of the second object and, upon identifying a relocation of the second object while monitoring the second object, adjust the capturing composition of the third camera according to the designated capturing composition based on the position of the moved second object.

8. The electronic device of claim 6,
wherein the processor is configured to determine whether a relocation of the second camera is needed based on the position of the moved first object and, if the relocation of the second camera is needed, control the driving module based on the position of the moved first object to move the first arm part to relocate the second camera.

9. The electronic device of claim 8, further comprising a second arm part connected with the main body and having the third camera placed thereon, wherein the processor is configured to determine whether a relocation of the third camera is needed based on the position of the moved second object and, if the relocation of the third camera is needed, control the driving module based on the position of the moved second object to move the second arm part to relocate the third camera.

10. The electronic device of claim 9, wherein the processor is configured to, when at least one of the second camera or the third camera needs to be relocated, control the driving module to move the moveable mechanism based on at least one of the position of the moved first object or the position of the moved second object to relocate at least one of the second camera or the third camera.

11. The electronic device of claim 1, wherein the first camera includes a wide-angle camera with a wide-angle lens or a plurality of lenses and includes a 360-degree camera configured to capture an image for a plurality of different directions to generate one wide-angle image.

12. A method of capturing an image by an electronic device, the method comprising:
monitoring each of one or more objects using a first camera with a first viewing angle of the electronic device;
determining whether each of the one or more objects has been moved while monitoring each of the one or more objects;
identifying an order of capturing moved objects among the one or more objects obtained by the first camera; and
sequentially capturing the moved objects among the one or more objects using a second camera with a second viewing angle of the electronic device based on a relocation of the one or more objects while monitoring each of the one or more objects according to the identified order of capituring,
wherein the order of capturing is identified to perform capturing to one side from the other side, and
wherein the capturing the moved objects includes controlling a driving module, including one or more motors for controlling a movement of a first arm part, to relocate the second camera based on the position of the moved objects to capture the moved objects without movement of a main body, if the moved objects are positioned within the first viewing angle of the first camera, and controlling a moving unit, including one or more wheels placed on the bottom of the main body and one or more motors for moving the one or more wheels, to move the main body so that the moved objects are positioned within the first viewing angle of the first camera, if the moved objects are positioned off the first viewing angle of the first camera.

13. A non-transitory machine-readable storage medium recording a program for capturing an image by an electronic device, the program, when executed, causing a processor of the electronic device to perform operations comprising:
monitoring each of one or more objects using a first camera with a first viewing angle of the electronic device;
determining whether each of the one or more objects has been moved while monitoring each of the one or more objects;
identifying an order of capturing moved objects among the one or more objects obtained by the first camera; and
sequentially capturing a moved object among the one or more objects using a second camera with a second viewing angle of the electronic device based on a relocation of the one or more objects while monitoring each of the one or more objects according to the identified order of capturing,
wherein the order of capturing is identified to perform capturing to one side from the other side, and
wherein the capturing the moved objects includes controlling a driving module, including one or more motors for controlling a movement of a first arm part, to relocate the second camera based on the position of the moved objects to capture the moved objects without movement of a main body, if the moved objects are positioned within the first viewing angle of the first camera, and controlling a moving unit, including one or more wheels placed on the bottom of the main body and one or more motors for moving the one or more wheels, to move the main body so that the moved objects are positioned within the first viewing angle of the first camera, if the moved objects are positioned off the first viewing angle of the first camera.

* * * * *